June 13, 1967     C. M. FULTON     3,325,069
SKI CARRIER FOR VEHICLES
Filed June 4, 1965     3 Sheets-Sheet 1
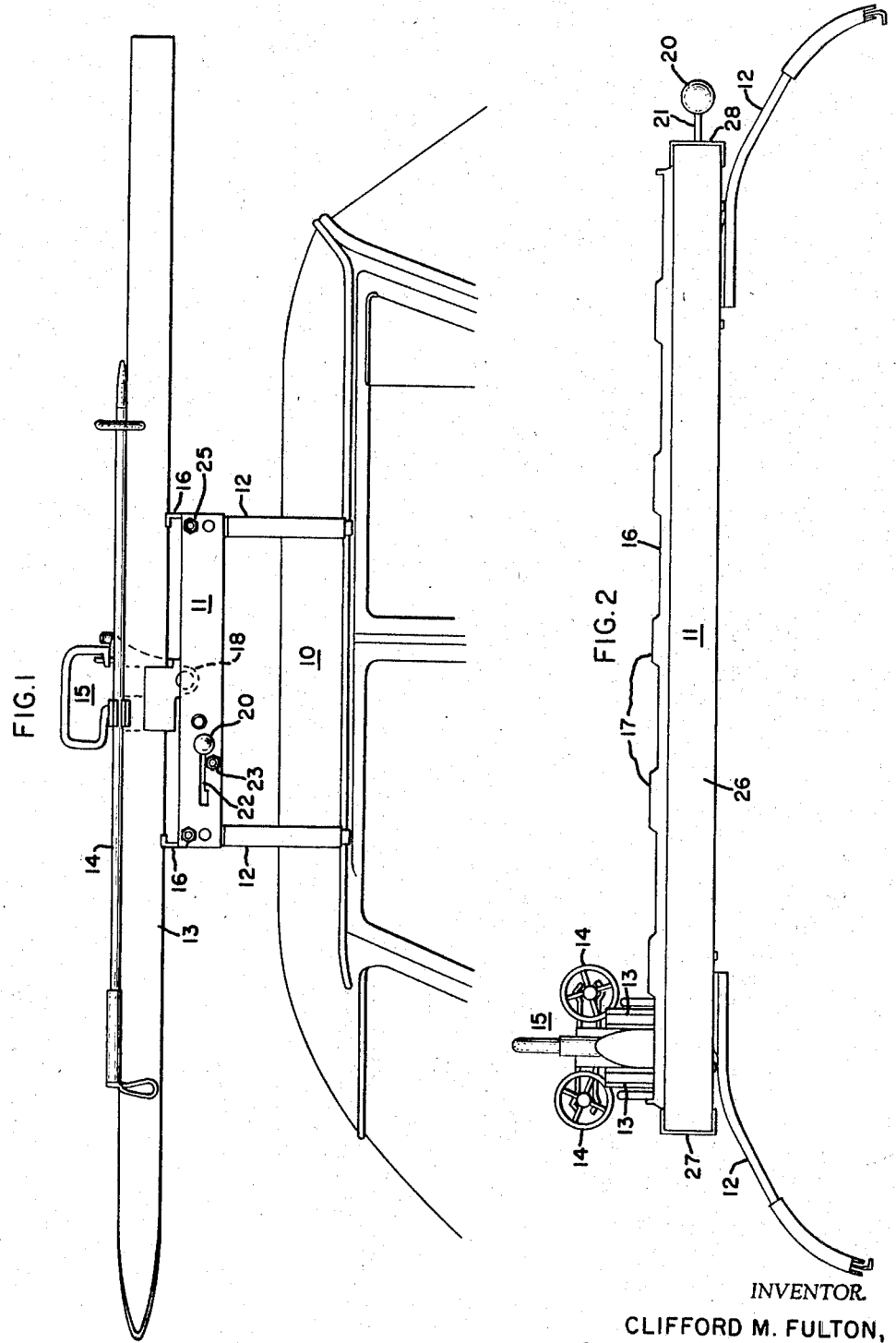
INVENTOR.
CLIFFORD M. FULTON,
BY
ATTORNEYS.

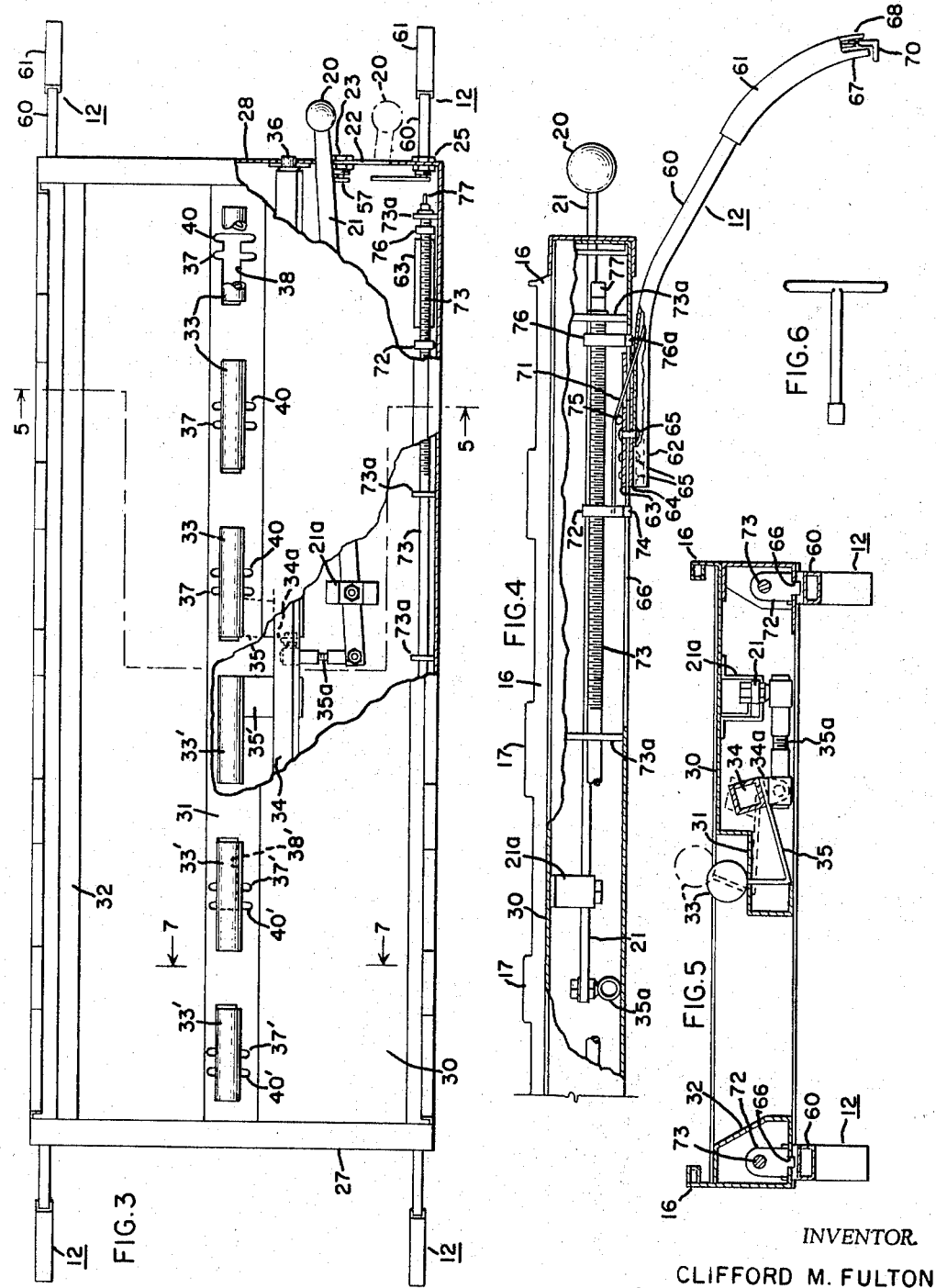

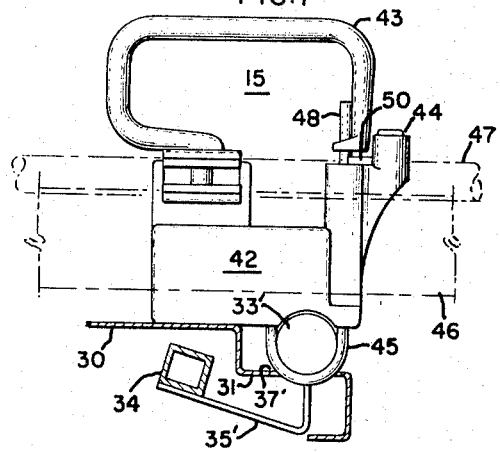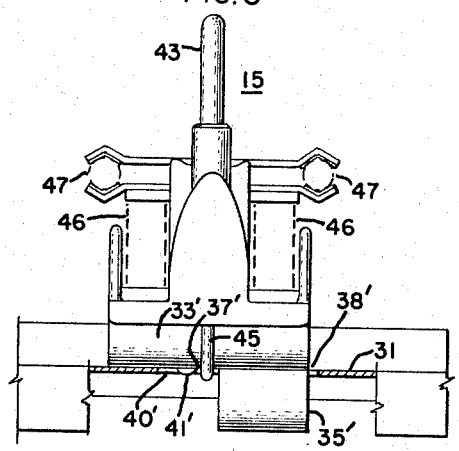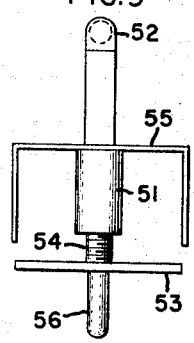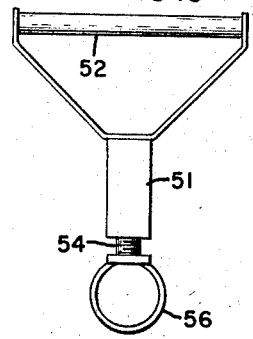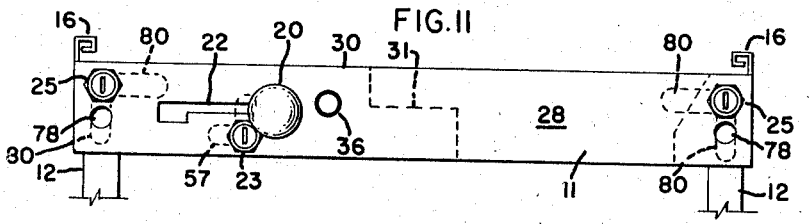

United States Patent Office 3,325,069
Patented June 13, 1967

3,325,069
SKI CARRIER FOR VEHICLES
Clifford M. Fulton, Estes Park, Colo., assignor to Kleineider-Fulton Co., Estes Park, Colo., a corporation of Colorado
Filed June 4, 1965, Ser. No. 461,324
6 Claims. (Cl. 224—42.1)

This invention relates to devices for transporting skis on vehicles and particularly to an improved ski carrier for automobile top mounting which affords ease in mounting of the skis and effective locking of the mounted skis to prevent their unauthorized removal.

When skiers travel by automobile it is desirable that their skis be carried outside, preferably on the top of the car, and various types of racks or mounting devices have been provided for this purpose. Some of these racks have included arrangements for locking the rack to the car body so that it may be left unattended. When the skis are carried on these racks mounted on the outside of the car it becomes desirable to provide for the locking of the skis as well as the racks so that they also may be left unattended, and accordingly it is an object of this invention to provide an improved apparatus for carrying skis on vehicle bodies and which affords locking of the skis to prevent their unauthorized removal.

It is another object of this invention to provide an improved rack for carrying a plurality of pairs of skis on the top of an automobile which includes a single locking mechanism for securing all of the pairs of skis on the rack.

It is another object of this invention to provide an improved rack for carrying skis on the top of an automobile which can be securely attached to the automobile and locked by a single lock and on which the skis may be securely held and locked to the rack by a single locking mechanism.

Briefly, in carrying out the objects of this invention in one embodiment thereof, a rack for carrying skis on a car top is constructed which comprises a rigid metal frame having parallel spaced rests for the skis and a drawdown mechanism between the rests for pressing the skis in position on the rack. The drawdown mechanism for all the skis is operated by a single lever and may be locked by a single lock. The skis preferably are mounted in pairs; suitable clamping devices having shackles or eyes are provided for securing the skis in pairs. When the skis are in position the drawdown mechanism is arranged to engage the shackles upon actuation of a single lever and draw the skis against the spaced rests. Lateral movement of the skis on the racks is prevented by suitable stops and, by locking the drawdown mechanism, the removal of the skis is prevented.

The features of novelty which characterize this invention are pointed out with particularity in the appended claims. The invention itself, however, both as to its organization and its manner of operation, together with further objects and advantages thereof, will best be understood upon reference to the following description taken in connection with the accompanying drawings in which:

FIG. 1 is a side elevation view of the upper portion of an automobile with a ski carrier embodying the invention mounted thereon;

FIG. 2 is an enlarged front elevation view of the carrier shown in FIG. 1;

FIG. 3 is a top plan view of the rack of FIG. 1 on the same scale as FIG. 2 and partly broken away to show the interior construction;

FIG. 4 is a somewhat enlarged view of the right end of the rack as shown in FIG. 2 with the wall broken away to show the interior contruction;

FIG. 5 is a sectional elevation view taken along the line 5—5 of FIG. 3;

FIG. 6 illustrates a tool employed in mounting the carrier of FIG. 1;

FIG. 7 is an enlarged sectional view taken along the line 7—7 of FIG. 3;

FIG. 8 is a rear elevation view of the portion of the carrier illustrated in FIG. 7 shown partly in section;

FIG. 9 is an elevation view of an adapter for securing a pair of skis on the carrier;

FIG. 10 is a side elevation view of the adapter of FIG. 9; and

FIG. 11 is an end elevation view of the carrier as viewed from the right end of FIG. 4.

Referring now to the drawings, FIGS. 1 and 2 illustrate an automobile body 10 having a ski carrier mounted thereon and comprising a rigid frame 11 and attaching members 12 for securing the frame to the car top in spaced relation above the top. For purposes of illustration a single pair of skis 13 and ski poles 14 are shown mounted in a lockable hand carrier 15. The hand carrier 15 is of the type disclosed and claimed in my copending application Ser. No. 437,911 filed Mar. 8, 1965 and assigned to the same assignee as the present invention.

The skis 13 are supported on longitudinal side rest members 16 which, as shown in FIG. 2, are provided with a plurality of raised portions 17 forming stops to prevent lateral movement of the skis 13 when they are resting on the members 16. The skis are drawn against the members 16 in a manner to be described below by a drawdown device which engages the shackle 18 of the carrier 15. The drawdown pressure is applied edgewise of the skis which are effectively unbendable in this direction. The drawdown operation is effected by movement of a knob 20 which is attached to a lever 21 and may be moved along the end of the frame 11 in a slot 22. A key actuated lock 23 is provided for retaining the lever 21 in its drawdown position. The attaching members 12 are securely held in the rain groove or gutter of the car top and are also locked by key actuated locks 25 which prevent unauthorized removal of the carrier.

The frame 11 is constructed of rigid metal members including longitudinal members 26 and end members 27 and 28, and the top of the frame is enclosed by a cover plate 30 extending over the near side of the carrier as viewed in FIG. 3 and having a step portion 31 adjacent the drawdown mechanism along the longitudinal center of the frame. The other half portion of the frame is open except for a cover 32 which extends along the edge thereof and encloses the mechanism for securing the attaching members 12 to the car top.

The drawdown mechanism for urging the skis against the rests 16 as illustrated in FIGS. 3, 4 and 5 is mounted along the central longitudinal axis of the carrier frame 11. This mechanism comprises a plurality of cylindrical hooks or tubular fingers arranged in two sets of three fingers in alignment along the longitudinal axis. The three fingers on the right of the center are designated 33 and the three fingers on the left 33'. These fingers are secured to a rotatable shaft 34 on arms 35 and 35', respectively.

The shaft 34 is journaled in the frame ends 27 and 28, the bearings for the end 28 being indicated at 36 in FIG. 3. The arms 35 of the fingers 33 are secured adjacent the left end of the fingers as viewed in FIG. 3 and the arms 35' are secured adjacent the right ends of the fingers 33'. Thus the fingers on the right overhang their support toward the right and those on the left toward the left and thus are readily accessible for attachment of the skis from the right and left sides, respectively, of the vehicle.

Except for their arrangement in oppositely facing pairs, the fingers 33 and 33' and the arms 35 and 35' are of identical construction. This construction is illustrated in FIG. 5 where an arm 35 has been illustrated as comprising a longer straight portion rigidly secured to the flat underside of the shaft 34 and a shorter straight portion bent to lie at an acute angle to the longer portion, this shorter portion extending vertically in FIG. 5 and having its upper end rigidly secured to the finger 33 so that it lies radially thereof.

The lever 21 is pivoted near its inner end on a U-shaped bracket 21a which is welded or otherwise securely attached to the plate 30. The lever 21 rotates the shaft 34 through a link 35a pivotally connected to the end of the lever and to a lug or crank 34a rigidly attached to the shaft. Because of the mechanical advantage of the lever with its short arm connected to the link 35a, a strong force may be applied to the shaft 34 to rotate it and apply the force necessary to pull a complete set of six pairs of skis downwardly against the rests 16.

The shackles or eyes of the ski holders or clamps fit closely about the fingers 33 and 33' as indicated in FIGS. 7 and 8 and, when the shaft 34 is rotated to draw the fingers downwardly toward the stepped portion 31 of the plate 30, the shackles enter slots 37 and 37' as exemplified by the slot 37' in FIGS. 7 and 8, the configuration of which is shown in dotted lines in FIG. 3 and in full lines at the right-hand end of FIG. 3 illustrating the oppositely oriented slot 37. These slots 37 and 37' are formed as portions of openings 38 and 38' which afford passage of the arms 35 and 35', respectively. By way of example, the slot 37 comprises two oppositely facing recesses or cutout portions at the edges of the opening 38; a similar slot is formed to the right of the slot 37 and spaced therefrom as indicated at 40. The construction of the opening 38' is essentially the same and includes slots 37' and 40'. Both the slots 37 and 40 serve the same purpose of affording movement of the shackles of ski holders into position when the fingers lie against the plate 31.

The slots 40 and 40' are located between the arms 35 and 35' and bumps or knobs 41 and 41', respectively, are formed on the lower sides of the fingers 33 and 33', the knob 41' being shown, by way of example, in FIG. 8. This construction is such that the shackle may be tightened about the finger adjacent the arm so that it cannot be slid along the finger because of the bump. Thus a single locking type hand carrier may be locked on the fingers without operation of the car carrier lock to prevent unauthorized removal. If thereafter the car carrier lock is operated, the finger will be drawn down so that the shackle of the locked hand carrier will be drawn into a slot 40 or 40'.

The hand carrier 15 as illustrated in FIGS. 7 and 8 comprises a body portion 42 having a handle 43, a key-operated lock 44, and a shackle 45 which has been shown positioned closely about the finger 33'. The carrier 15 is provided with recesses for holding skis, the position being indicated by dotted line portions 46 and ski poles 47 similarly indicated by dotted lines. A pair of skis and ski poles is locked within the hand carrier 15 by closing the shackle 45 so that its upper end indicated at 48 engages the handle 43 and prevents the handle from rotating. The shackle is locked in position by the lock 44 which moves a plunger 50 into engagement with a notch in the shackle.

It will now be evident that the shackle 45 cannot be moved in either direction from its position shown in FIG. 8, the arm 35' preventing its movement to the right and the bump 41' preventing its movement over the finger 33' to the left. Thus when the arm 35' is rotated downwardly or in a clockwise direction as viewed in FIG. 7, the finger 33' is drawn against the stepped plate 31. This also draws the skis down against the rests 16 and holds them securely in position thereby preventing their removal when the lever 21 is moved from its position indicated by dotted lines in FIG. 3 to its full-line position.

When a skier does not have his skis secured in a carrier such as the hand carrier 15, a clamping device of the type indicated in FIGS. 9 and 10 may be employed, this device comprising a body portion 51 having a handle 52 and an adjustable ski retainer 53 mounted on a threaded shaft 54 which is threaded into the body 51 for the purpose of clamping the skis onto the body 51 against a U-shaped holder 55. When the skis are mounted in this clamp, the retainer 53 is moved into a position so that its shackle or eye indicated at 56 is in alignment with the handle along the longitudinal axis of the skis. This positions the eye for mounting on the fingers 33. When the clamp illustrated in FIGS. 9 and 10 is in position with skis clamped therein, the drawing down of the finger 33 prevents turning of the retainer 53 with respect to the body 51 and locks the skis in position, the rotation of the skis being prevented by the stops 17 on the rests 16.

In order to lock the lever 21 in its full line position shown in FIG. 3, the lock 23 is positioned adjacent the arm 21 so that upon operation a locking bar 57 shown in dotted lines in FIG. 11 is rotated in a clockwise direction from its horizontal position to its upright position extending across the slot 22; this prevents movement of the knob 20 to the left. Thus the single lock 23 is effective to lock all six pairs of skis securely on the carrier frame.

The attaching members or mounting legs 12 are constructed so that they may readily be adjusted to the dimensions of the width of a car top and then by operation of the adjusting mechanism be clamped to the rain gutter in a manner such that unauthorized removal cannot be effected without destruction of the attaching members.

FIG. 4 illustrates the right-hand attaching member which is secured to the right-hand side of the car toward the rear as viewed in FIG. 1. All four members 12 are of the same construction and comprise a main tubular leg 60 of rectangular cross section having a lower curved portion provided with a suitable protective plastic coating or covering 61 which prevents abrasion of the car top surface. The leg 60 includes a straight portion 62 which is attached to the lower wall of the frame 11 and is slidably mounted thereon. The mounting arrangement includes a slide comprising upper and lower slide plates 63 and 64, respectively, which are spaced apart to accommodate the lower wall of the frame and are secured together by three rivets indicated at 65. These rivets are movable along a slot 66 and the assembly is such that there is some friction between the slide and the frame to resist sliding movement.

The end of the section 60 terminates in an inner end wall portion 67 and an opposite outer wall portion 68, the side walls of the tube being removed at the end so that the flange of a rain gutter may fit between the two wall portions at the end of the leg. A clamping element 70, which is of right-angled configuration and faces inwardly, is provided for the leg 60 and is attached at the end of a flexible steel tension strap or ribbon 71. The ribbon 71 is securely attached to a lug 72 threadedly engaging a threaded rod 73 and having a guide portion 74 which lies in the slot 65 and prevents rotation of the lug when the rod is rotated. The rod 73 is rotatably mounted in a plurality of brackets 73a rigidly secured to the adjacent longitudinal side wall of the frame. The flexible strap 71 engages a corner guide member 75 mounted on the top plate 63 of the slide. This guide member allows the strap to slide easily at the turn where it is bent from the angle of the leg 60 to the horizontal. A second lug 76 of the same construction as the lug 72 and having a guide portion 76a engaging the slot 65 is mounted on the rod 73 to the right of the lug 72 and spaced a distance greater than that necessary to accommodate the slide therebetween.

The rod 73 extends the length of the carrier and is oppositely threaded to produce opposite movement of the legs 60 on opposite sides of the car. Thus when the rod is rotated the lugs 72 and 76 are moved in opposite directions on opposite sides of the car.

In order to rotate the shaft 73 the socket wrench or tool shown in FIG. 6 is inserted through a hole in the respective end wall opposite the end of the rod indicated at 77 which is of a configuration to engage the socket of the wrench. The location of the hole is indicated at 78 in the wall 28 in FIG. 11 and is directly below a respective key operated lock 25, the hole being open for access when a lock bar indicated at 80 is in its locked position, both the horizontal and vertical positions being indicated in FIG. 11. When the locks are locked the bar 80 lies in its vertical position and closes the holes 78 to prevent access for operating the rod 73.

When it is desired to install the carrier on a car top, the rods 73 are rotated until the legs 60 are positioned apart a distance somewhat greater than the width of the car top. The rods 73 are then rotated to move both pairs of mounting legs inwardly until the lower plastic covered portions 61 engage the car top, whereupon the wall portions 67 are inserted in the rain gutter. When the rods 73 are rotated to move the legs inwardly, the slide is engaged by the lug 76 pressed inwardly to locate the legs in the required positions. After the lower ends of the legs have been positioned in the rain gutter, each rod is rotated in the opposite direction to move the lug 76 away from the leg slide and to release the flexible strap 71 and loosen the clamp 70. For many installations this reverse rotation of the rods may be necessary to release the clamp sufficiently to afford its positioning about the rain gutter. After the clamp has been positioned, the rod is again rotated to move the lugs 72 and 76 inwardly and thereby tighten the flexible strap 71 and draw the clamp 70 tightly into position so that the rain gutter is gripped securely and removal of the legs from the car top prevented.

The spacing of the lugs 72 and 76 is such that the lug 72 may be moved to tighten the strap 71 the required amount without having the lug 76 engage the slide. Thus substantial tension is maintained on the strap 71. The friction between the slide and the frame is sufficient to afford the outward movement of the lugs 72 and 76 without displacing the legs. Such displacement is also limited by the leg portions 67 when they lie within the rain gutter.

After the supporting legs have been securely attached in the foregoing manner, the tool of FIG. 6 is withdrawn and the locks 25 are actuated to move the bars 80 to their vertical positions, closing each respective opening 78.

While the invention has been illustrated and described in connection with a specific embodiment thereof, various modifications and other applications will occur to those skilled in the art. Therefore it is not desired that the invention be limited to the details of construction illustrated and described and it is intended by the appended claims to cover all modifications which fall within the spirit and scope of the invention.

I claim:

1. A combined ski carrier and lock for mounting on a vehicle comprising a rigid frame, spaced ski rests on said frame, means intermediate said rests for gripping a ski and for drawing it downwardly to press it onto said rests, means including a plurality of tubular legs for mounting said frame on the top of a vehicle body, each of said legs being slidably attached to said frame for movement laterally of the vehicle body and having a foot portion adapted to rest in the rain gutter of a vehicle top, means including a hook element adjacent the respective foot portion of each leg and a flexible tension member attached to said element and extending through the leg for engaging the bottom of the rain gutter adjacent the respective foot portion, actuating means for securing said mounting means in position comprising means for sliding said legs on said frame and means for drawing said tension members through the legs to clamp said hooks in position, locking means for preventing actuation of said last-mentioned means to prevent removal of said frame from the vehicle top, and means for locking said gripping means in its downward position to prevent removal of the ski from said frame whereby the ski is effectively locked to the vehicle by the locking of both said locking means.

2. A carrier for mounting on a vehicle top for transporting skis and the like comprising a rigid frame, a plurality of pairs of legs for mounting said frame in spaced relation to a vehicle top each of said legs being tubular and having its upper end slidably mounted on said frame for movement laterally of the vehicle top and a lower portion positioned to engage the top and having a foot arranged to extend into the rain gutter of the top, means for adjusting the legs of each pair to the width of the vehicle top and including a hook arranged to engage the outside of the gutter adjacent said foot and a member within the leg for drawing the hook into clamping position on the gutter, said adjusting means being movable into a first position for moving the legs of each pair together laterally into engagement with the vehicle top and to a second position for clamping each of said feet and the respective ones of said hooks in position on the gutter of the vehicle, and key-actuated locking means for preventing actuation of said adjusting means to release said legs from the rain gutter.

3. A carrier for mounting on a vehicle top as set forth in claim 2 wherein said adjusting means includes a rotatable threaded shaft mounted in said frame and extending between each pair of legs, the two end portions of said shaft being threaded oppositely, pairs of spaced lugs threaded on said shaft near respective ends thereof, guides on said frame for preventing rotation of said lugs, the outer lug of each pair being positioned to engage the adjacent one of said legs and move it inwardly of said frame upon rotation of said shaft in one direction, the inner lug of each pair being connected to said member for drawing said hook toward said foot upon inward movement thereof on rotation of said shaft in said one direction, the spacing of said lugs affording clamping of said hooks against a rain gutter of a vehicle top before said outer lugs engage the respective ones of said legs and affording engagement of each of said outer lugs and the respective leg when said hooks are released from the gutter whereby said lugs may be withdrawn outwardly by reverse rotation of said shaft after positioning of said legs and thereupon said hooks placed about the gutter and clamped in position by rotation of said shaft again in said one direction.

4. A combined ski carrier and lock for mounting on a vehicle comprising a rigid frame having two spaced side members, a plurality of rests for retaining pairs of skis in parallel spaced positions on said members, drawdown means mounted along a line parallel to and between said members, said drawdown means including individual members aligned with respective ones of said rests and being movable between an upper release position and a downward retaining position, retaining clamps for holding skis in pairs and having elements for engaging respective ones of said individual drawdown members whereby pairs of skis may be drawn securely against said side rests, means for preventing removal of said clamp elements from said drawdown members when in their down positions, a single actuating member for operating said drawdown members simultaneously, and means for locking said actuating member in its position to hold said drawdown members in their downward positions.

5. A combined ski carrier and lock as set forth in claim 4 including a plate covering said drawdown means and wherein said drawdown means comprises a rotatable shaft mounted on said frame below said plate and parallel to said side members, said individual members comprising arms on said shaft extending through recesses in said plate and fingers on said arms positioned above said plate, said fingers in the down position of said drawdown means being held against said plate and the recesses in said plate having extensions affording passage of said clamp elements when engaging said fingers.

6. A combined ski carrier and lock as set forth in claim 5 wherein said actuating member comprises an elongated lever pivoted near one end adjacent said shaft and below said plate, and a crank arm connected between said lever and said shaft for rotating said shaft on movement of said lever, said lever extending through said frame and having a handle portion outside said frame, said locking means being arranged to lock said handle to said frame in the actuated position of said lever.

References Cited

UNITED STATES PATENTS

| | | | |
|---|---|---|---|
| 2,032,591 | 3/1936 | Pride | 224—42.4 X |
| 2,480,353 | 8/1949 | Bjork | 224—42.1 |
| 2,784,888 | 3/1957 | Lecanu-Deschamps | 224—42.1 |
| 2,833,453 | 5/1958 | Barreca. | |
| 2,956,812 | 10/1960 | Lundquist. | |
| 3,018,897 | 1/1962 | Carlyle. | |
| 3,225,987 | 12/1965 | Bonner | 224—45 |

GERALD M. FORLENZA, *Primary Examiner.*

F. E. WERNER, *Assistant Examiner.*